Patented Feb. 14, 1933

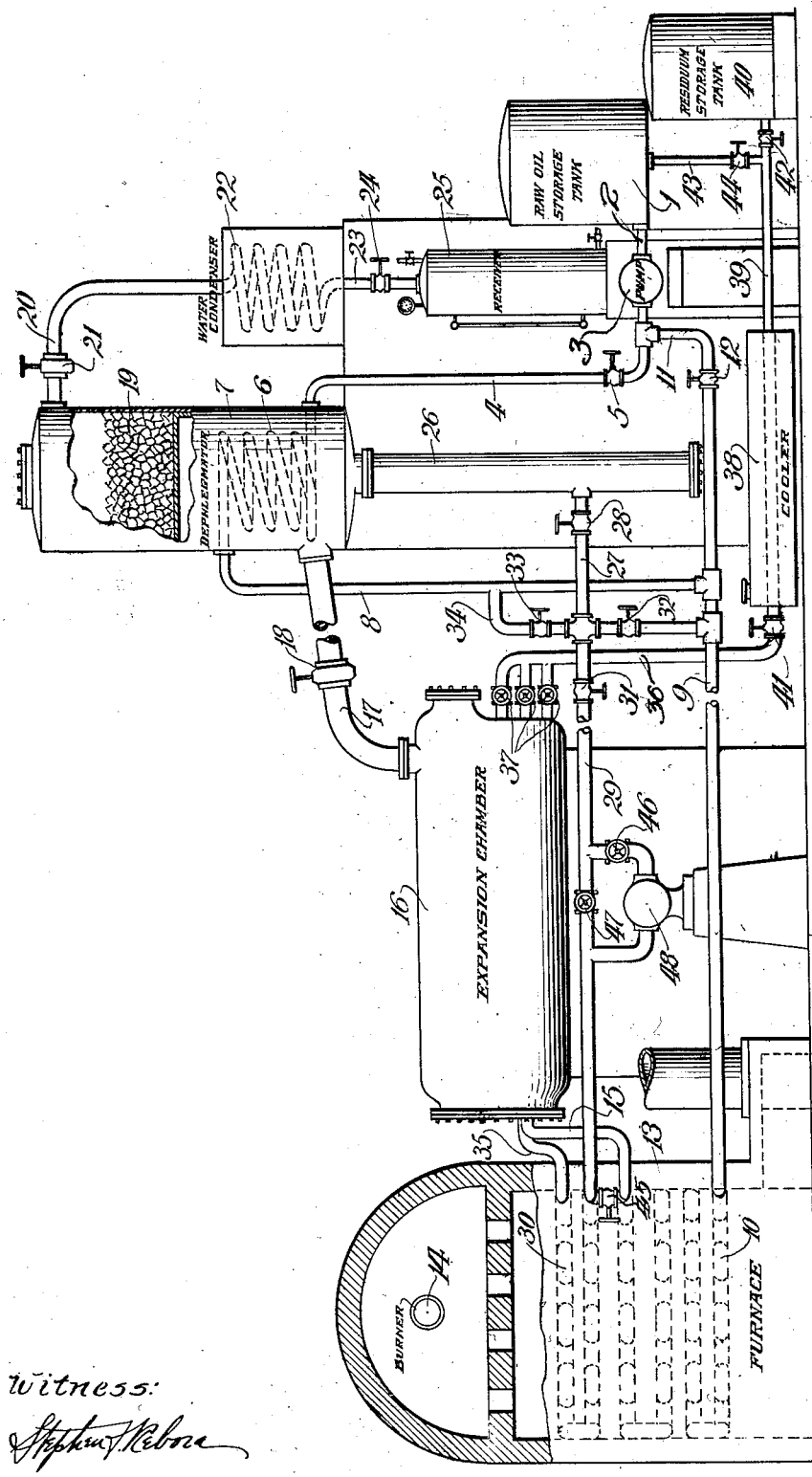

1,897,567

UNITED STATES PATENT OFFICE

JOSEPH G. ALTHER, OF CHICAGO, ILLINOIS, ASSIGNOR TO UNIVERSAL OIL PRODUCTS COMPANY, OF CHICAGO, ILLINOIS, A CORPORATION OF SOUTH DAKOTA

PROCESS AND APPARATUS FOR THE CONVERSION OF HYDROCARBON OILS

Application filed January 23, 1922. Serial No. 531,150.

This invention relates to the conversion of hydrocarbon oil and refers more particularly to a process in which, after the conversion of the initial charge of oil, the reflux condensate separated out in the dephlegmating zone, is returned and retreated separately in the heating zone to effect a further recracking and conversion action, and further to provide selective conditions most suitable to the desired reaction of the raw oil and the separate treatment of the reflux or a mixture of the reflux and raw oils.

The single figure is a side elevational view of the apparatus. Referring to the drawing, the raw oil is pumped from any suitable storage tank such as 1 through the line 2, pump 3, and line 4, controlled by a valve 5, to a closed coil pipe 6, which is mounted in the lower portion of the dephlegmator 7 or refluxing column, and which serves both the purpose of a preheater for the raw oil and a dephlegmating apparatus for the oil vapors. The oil may be thus circulated through the dephlegmator where it is preheated, then passing through the pipe 8 flows into the line 9 which is connected to the heating tubes 10. As an alternative way of introducing the oil to the system, a pipe 11 controlled by a valve 12 is connected to the discharge side of the pump and also has communication with the line 9. When charged through the line 11, the oil is not preheated. A further service which the line 11 provides is to control the amount of oil which is circulated through the preheating or dephlegmating coil 6. If conditions of dephlegmation are such that the refluxing or dephlegmating column is being cooled at too great a rate by the incoming raw oil, a portion of this dephlegmating medium may be short circuited through the line 11 instead of the entire volume passing through the preheating coil as explained.

The tubes 10 are mounted in a furnace 13 which is shown top fired, receiving its heat from burners 14. The oil after being raised to a cracking temperature in the heating tubes 10, is directed to transfer line 15 to an expansion chamber 16 where the oil is permitted to vaporize, the vapors passing off through the line 17 controlled by a valve 18 to the dephlegmator 7 where they are refluxed first by coming in contact with the preheating raw oil coil 6 and in the upper part of the dephlegmator passing through a section of broken material or Raschig rings as shown at 19 or a series of baffling plates or pans which serve to produce a reflux condensing action of the oil vapors. The vapors pass off from the top of the dephlegmator through the line 20 in which is interposed a valve 21 to a water condenser 22, passing therefrom through the line 23 controlled by a valve 24 to a receiver 25.

The reflux condensate on the other hand, which collects in the lower leg 26 of the dephlegmator, may be drawn off through the line 27 regulated by a valve 28 and passed directly through the line 29 to the heating coils 30, or by manipulation of the valves 31 and 32 may be directed wholly or in regulated quantities through the pipe 32 to be combined with the incoming raw oil in the pipe 9. If, on the other hand, it is desired to introduce with the returned reflux which is to be separately heated in the coils 30, a quantity of raw oil, the valve 32 should be closed, the valve 31 opened, and valve 33 in the pipe 34 connecting the line 29 and 8 opened to the amount desired. By means of these actions, the reflux may be wholly returned and separately retreated in the tubes 30, or a part returned to the tubes 30 and a part combined with the raw oil. Again, regulated quantities of the raw oil may be combined with the returned reflux and treated therewith, or both the reflux and raw oil isolated and treated separately. Oil returned to the separate heating coil 30 which will be to a great extent the reflux from the dephlegmator, is subjected to the maximum or highest temperatures maintained in the heating zone due to the positioning of the tubes therein. These tubes being in the hottest part of the furnace, are better adapted to treat the returned reflux condensate due to the refractory character of this oil. The heated reflux passing from the tubes 30 through the transfer line 35 is introduced to the expansion chamber 16 and there permitted to vaporize.

The unvaporized product from the conversion which takes place in the expansion chamber is drawn off through the line 36 which is connected at one or more levels with the expansion chamber, the draw-off at each level being controlled by a valve 37. The unvaporized oil with more or less free carbon flows down through the line 36 and cooler 38 and line 39 to the residuum storage tank 40. Valves 41 and 42 are positioned in the residuum line for controlling the flow of the liquid. If it is desired to recirculate the residuum or unvaporized oil drawn off from the expansion chamber, it may be directed back to the raw oil storage tank one (1) through the pipe 43 controlled by a valve 44. This control of the residuum is accomplished by closing the valve 42 and leaving the valve 44 in the line 43 open. Valves are positioned in various places in the system so that if desired, differential pressures may be maintained upon the different portions of the system.

The oil coming from either the heating coil in which the raw oil charging stock is heated, or from the coil in which the reflux is retreated, is introduced to the expansion chamber in a manner that it serves to flush out any precipitated carbon which may tend to collect in the bottom of this chamber and float it off in suspension through the residuum draw-off with the unvaporized oil.

Another advantage of retreating the reflux separately is the fact that the increased temperature of the reflux as it is introduced to the expansion chamber, is sufficient to produce conversion in the heated oil coming from the adjoining set of heating tubes in which the raw oil charging stock is being treated. This mixing and combining of the retreated reflux and heated raw oil promotes a conversion action in the expansion chamber.

A short valve control connection 45 is shown between the two sets of heating tubes, and during the initial stage of operation the coils may be used as a single continuous coil by circulating the oil from the lower tubes 10 through the reflux tubes 30 through this connection and thence into the expansion chamber through the transfer line 35. A by-pass controlled by valves 46 and 47 is interposed in the line 29 whereby a pressure pump 48 may be interposed in the reflux return line to increase the velocity of the reflux in its recirculation. The pump is connected to the line 29 by suitable suction and discharge connections.

The type of furnace may be varied and the character of the heating elements as well as their location in respect to the furnace may differ from the construction shown in drawing; also different means may be devised for returning and recycling the oils without departing from the spirit and scope of the invention.

I claim as my invention:

1. A process for converting hydrocarbon oil, consisting in utilizing regulated quantities of the oil charge as a cooling medium in a dephlegmating zone, combining the preheated and cool raw oil, and subjecting the mixture to a cracking temperature in a heating zone, passing the heated oil to an expansion stage and there permitting the separation of the vapors and unvaporized oil, subjecting the vapors to a dephlegmating and condensing action, returning a portion of the refluxed oil constituents to be retreated in a separate stage positioned in the hottest portion of the heating zone and combining a portion of the refluxed oil constituents with the oil charge stock for retreatment, passing the heated charging retreated products to the expansion stage, recirculating controlled quantities of the unvaporized oils from the expansion stage through the system, maintaining a regulated vapor pressure upon the respective zones of reaction.

2. A process for converting hydrocarbon oil, consisting in utilizing regulated quantities of the oil charge as a cooling medium in a dephlegmating zone, combining the thus preheated oil with the cool raw oil, and subjecting the mixture to a cracking temperature in a heating zone, passing the heated oil to an expansion stage and there permitting the separation of the vapors and unvaporized oil, subjecting the vapors to a dephlegmating and condensing action, returning a portion of the refluxed oil constituents to be retreated in a separate stage positioned in the hottest portion of the heating zone under increased pressure conditions and combining a portion of the refluxed oil constituents with the oil charge stock for retreatment, passing the heated charging stock and retreated products to the expansion stage, recirculating controlled quantities of the unvaporized oils from the expansion stage through the system, maintaining a regulated vapor pressure upon the respective zones of reaction.

3. A process of oil conversion comprising maintaining a quantity of heated hydrocarbons in an enlarged zone wherein substantial conversion and vaporization takes place, subjecting the vapors to reflux condensation, simultaneously separately delivering reflux condensate separated from the vapors and charging oil for the process to independent heating conduits, delivering the reflux condensate subsequent to passage through the independent heating conduit to which it is supplied directly to said enlarged zone, delivering a portion of the charging oil subsequent to its passage through the independent conduit to which it is supplied directly to said enlarged zone, and uniting the remaining portion of the charging oil with the reflux condensate being supplied to the other independent conduit.

4. An apparatus for converting hydrocarbon oil comprising an enlarged reaction chamber, a reflux condenser, means for passing vapors from said enlarged reaction chamber to said reflux condenser, means for separately passing reflux condensate from said reflux condenser and charging oil from a source of supply through independent heating coils, means for delivering reflux condensate subsequent to passage through one of said independent heating coils directly to said enlarged reaction chamber, means for delivering a portion of the charging oil subsequent to its passage through the other of said independent heating coils directly to said enlarged reaction chamber, and means for delivering the remaining portion of such charging oil to the other independent heating coil through which the reflux condensate is being passed.

5. An apparatus for cracking heavier hydrocarbon oils for the production of lighter hydrocarbon oils therefrom, comprising a pressure still having heating surfaces arranged in a heating flue, and means for cyclically circulating oil over said heating surfaces, a fire-box communicating with one end of said flue, a single-pass heating coil arranged in said flue between the fire-box and the said heating surfaces of the pressure still, said heating coil being arranged to discharge into said pressure still, a reflux condenser and connections for passing vapors from said pressure still thereto, including means for reducing the pressure on the vapors between the pressure still and the reflux condenser, and means separate from said circulating means, for forcing reflux condensate from said reflux condenser without admixture with unvaporized oil from said pressure still through said single-pass heating coil.

6. The method of protecting the heating surfaces of externally heated circulatory pressure stills including a bulk supply of oil, from the heating gases therefor while at highest temperature, which comprises forcing a tar-free oil once through a separate cracking zone in a stream of restricted cross-section and then into the bulk supply of oil which is being cracked by circulation over the heating surfaces of the pressure still, and which receives additional fresh charging stock from an independent source, and passing the heating gases for the pressure still first in heat exchange with the tar-free oil in the said separate cracking zone, and then passing the heating gases, the temperature of which has been decreased by the heat absorbed by the oil in the said separate cracking zone, over the heating surfaces of the pressure still proper.

JOSEPH G. ALTHER.